US006153114A

United States Patent [19]

Figueredo et al.

[11] Patent Number: 6,153,114

[45] Date of Patent: Nov. 28, 2000

[54] THIN-FILM PRINTHEAD DEVICE FOR AN INK-JET PRINTER

[75] Inventors: Domingo A. Figueredo, Albany; David R. Thomas, Corvallis, both of Oreg.; Mark A. Buonanno, Sunnyvale, Calif.

[73] Assignee: Hewlett-Packard Company, Palo Alto, Calif.

[21] Appl. No.: 09/212,501

[22] Filed: Dec. 15, 1998

Related U.S. Application Data

[62] Division of application No. 08/568,208, Dec. 6, 1995, Pat. No. 5,883,650.

[51] Int. Cl.[7] .............................. B41J 2/04; G11B 5/127

[52] U.S. Cl. .............................. 216/27; 216/16; 347/62

[58] Field of Search .............................. 216/27, 16; 347/62

[56] References Cited

U.S. PATENT DOCUMENTS

| | | | |
|---|---|---|---|
| 3,775,838 | 12/1973 | Dalmasso | 29/577 |
| 3,852,563 | 12/1974 | Bohorquez et al. | 219/216 |
| 3,973,106 | 8/1976 | Ura | 219/216 |
| 4,429,321 | 1/1984 | Matsumoto | 346/140 R |
| 4,438,191 | 3/1984 | Cloutier et al. | 430/324 |
| 4,490,728 | 12/1984 | Vaught et al. | 346/1.1 |
| 4,513,298 | 4/1985 | Scheu | 346/140 R |
| 4,514,741 | 4/1985 | Meyer | 346/140 R |
| 4,528,574 | 7/1985 | Boyden | 346/140 R |
| 4,535,343 | 8/1985 | Wright et al. | 346/140 R |
| 4,616,408 | 10/1986 | Lloyd | 29/611 |
| 4,695,853 | 9/1987 | Hackleman et al. | 346/140 R |
| 4,716,423 | 12/1987 | Chan et al. | 346/140 R |
| 4,719,477 | 1/1988 | Hess | 346/140 R |
| 4,725,859 | 2/1988 | Shibata et al. | 346/140 R |
| 4,809,428 | 3/1989 | Aden et al. | 29/611 |
| 4,847,630 | 7/1989 | Bhaskar et al. | 346/1.1 |
| 4,862,197 | 8/1989 | Stoffel | 346/140 R |
| 4,922,265 | 5/1990 | Pan | 346/1.1 |
| 4,927,505 | 5/1990 | Sharma et al. | 204/34.5 |
| 4,931,813 | 6/1990 | Pan et al. | 346/140 R |
| 4,965,611 | 10/1990 | Pan et al. | 346/1.1 |
| 5,008,689 | 4/1991 | Pan et al. | 346/140 R |
| 5,010,355 | 4/1991 | Hawkins et al. | 346/140 R |
| 5,122,812 | 6/1992 | Hess et al. | 346/1.1 |
| 5,159,353 | 10/1992 | Fasen et al. | 346/140 R |
| 5,229,785 | 7/1993 | Leban | 346/1.1 |
| 5,254,493 | 10/1993 | Kumar | 437/60 |
| 5,420,627 | 5/1995 | Keefe et al. | 347/87 |
| 5,568,171 | 10/1996 | Keefe et al. | 347/58 |

OTHER PUBLICATIONS

Ameen et al., IBM Technical Disclosure Bulletin, vol. 21, No. 3, Aug. 1978, pp. 953–954.

*Primary Examiner*—Randy Gulakowski
*Assistant Examiner*—Shamim Ahmed

[57] ABSTRACT

The present invention provides an ink-jet printhead substructure highly thermally efficient and greatly simplified in both the method of manufacture and resulting structure. The printhead substructure of the present invention comprises a resistor formed on an insulated substrate, a single conductor layer that provides both the conductive bonding interconnect pads and the conductive traces for the substructure, a passivation layer and a cavitation barrier. The resistor, passivation layer and cavitation barrier may comprise a single graded layer. The graded thin-film structure provides the resistor, passivation and cavitation barrier components without creating abrupt layer interfaces thereby, improving printhead reliability and durability. Fabrication of the printhead substructure of the present invention requires only two or three lithographic masks and a minimized number of sputter source materials.

12 Claims, 3 Drawing Sheets

THIN-FILM PRINTHEAD DEVICE FOR AN INK-JET PRINTER

CROSS REFERENCE TO RELATED APPLICATION(S)

This is a divisional of application Ser. No. 08/568,208 filed on Dec. 6, 1995 now U.S. Pat. No. 5,883,650.

TECHNICAL FIELD

This invention relates to the manufacture of printheads for the pens of ink-jet printers.

BACKGROUND AND SUMMARY OF THE INVENTION

An ink-jet printer includes a pen in which small droplets of ink are formed and ejected toward a printing medium. Such pens include printheads with orifice plates having very small nozzles through which the ink droplets are ejected. Adjacent to the nozzles inside the printhead are ink chambers, where ink is stored prior to ejection. Ink is delivered to the ink chambers through ink channels that are in fluid communication with an ink supply. The ink supply may be, for example, contained in a reservoir part of the pen.

Ejection of an ink droplet through a nozzle may be accomplished by quickly heating a volume of ink within the adjacent ink chamber. The rapid expansion of ink vapor forces a drop of ink through the nozzle. This process is called "firing." The ink in the chamber may be heated with a transducer, such as, a resistor that is aligned adjacent to the nozzle.

Thin-film resistors are conventionally used in printheads of thermal ink-jet printers. In such a thin-film device, the resistive heating material is typically deposited on a thermally and electrically insulated substrate. A conductive layer is then deposited over the resistive material. The individual heater elements (i.e., resistors) therein are dimensionally defined by conductive trace patterns that are lithographically formed using conventional masking, ultraviolet exposure and etching techniques on the conductive and resistive layers.

One or more passivation layers are applied over the conductive and resistive layers and then selectively removed to create a via for electrical connection of a second conductive layer to the conductive traces. The second "interconnect" conductive layer is patterned to define a discrete conductive path from each trace to an exposed bonding pad remote from the resistor. The bonding pad facilitates connection with a conductive lead from a flexible circuit that is carried on the pen. That circuit conveys control or "firing" signals from the printer's microprocessor to the resistors.

Materials providing passivation and cavitation barriers are layered over the resistive and conductive layers to complete the printhead substructure. The printhead substructure is overlaid with an ink barrier layer. The ink barrier is etched to define the shape of the ink chambers that are situated above, and aligned with, each resistor. An orifice plate overlays the ink barrier, with a nozzle opening to each chamber.

The resistors in the thin-film device are selectively driven by the above described thermo-electric integrated circuit part of the printhead substructure. The integrated circuit conducts the electrical signals from the printer microprocessor to the resistors, via the two conductive layers, to heat the resistors and create the super-heated ink bubbles for ejection from the chamber through the nozzle.

In summary, conventional thermal ink-jet printhead substructures require at least three major components be present in the firing chamber portion of the device: (1) a heater (resistor) layer, (2) a passivation (dielectric) layer, and (3) a cavitation barrier. Moreover, conventional ink-jet printhead substructures require at least four metal depositions to create the conductive and resistive layers, hence, requiring up to four source sputtering materials. Conventional printhead substructure fabrication also requires a double dielectrical deposition and at least five lithographic masks (excluding the ink barrier mask) in order to define the necessary thin-film IC components. Accordingly, conventional printhead substructure fabrication is both a labor intensive and an expensive process.

Current thermal ink-jet printhead substructures use aluminum as one of the basic components for the formation of the resistors and conductors. Although aluminum resistors and conductors are acceptable for most applications, they suffer from two major drawbacks: (1) electromigration, or physical movement, of the aluminum in the conductive traces which, in turn, causes reliability failures at relatively high current densities for both the resistor and the conductor, and (2) relatively complex fabrication processes. Also, conventional aluminum-based structures degrade rapidly at current densities greater than about $1\times10^6$ amps/$cm^2$.

A preferred embodiment of the present invention provides an ink-jet printhead substructure greatly simplified in both the method of manufacture and the resulting structure. The printhead substructure of the present invention comprises a resistor formed on an insulated substrate, a single conductor layer that provides both the interconnect paths and the conductive traces for the substructure, a passivation layer and a cavitation barrier.

The dual function (i.e., conductive interconnect paths and conductive traces) of the conductor layer of the present invention provides a greatly simplified printhead substructure. Additionally, the dual functioning conductor layer provides a simplified method of manufacture of the substructure as only one metal deposition is necessary.

In a preferred embodiment, the conductor layer is comprised of a noble metal, preferably gold. A gold conductor layer provides conductive traces with low resistance, a low rate of electromigration and excellent bonding properties.

Additionally, in a preferred embodiment of the present invention the resistor, passivation layer and cavitation barrier may comprise a single graded layer. This "graded thin-film structure" (GTFS) provides the resistor, passivation and cavitation barrier components without creating abrupt layer interfaces. Such abrupt, discrete component layers are typically the weaker areas in conventional printhead substructures and reduce printhead reliability and durability. Only a single sputter source material is needed to fabricate the GTFS.

Additionally, regardless of whether the resistor, passivation layer and cavitation barrier comprise discrete layers or a GTFS, fabrication of the printhead substructure of the present invention requires only two or three lithographic masks. With fewer masks, a thinner layer of conductive, passivation and cavitation barrier materials can be manufactured.

Printhead substructures comprised of thinner layers decrease thermal losses since thinner layers in contact with the substructure resistor reduces the typical thermal energy loss between the resistor and the ink. The passivation layer typically contributes the most to the substructure thermal inefficiencies due to its relatively low thermal conductivity characteristics. A more efficient thermal system, in turn, produces printheads with a lower turn-on-energy (TOE). Lower TOEs reduce printhead heating. Excessive printhead heating generates bubbles from air dissolved in the ink and causes prenucleation of the ink vapor bubble. Air bubbles within the ink and prenucleation of the vapor droplet result in a poor ink droplet formation and droplet volume control and thus, poor print quality.

The printhead substructure resistor of the present invention comprises a refractory metal, preferably tantalum-based. Refractory metal-based substructures do not suffer from the same electromigration problems as do aluminum-based systems. Moreover, refractory metal-based printhead substructures can operate at relatively high temperatures with minimal electrical or thermal degradation. Operation at higher temperatures allows an increase in print speed without sacrificing print quality.

DESCRIPTION OF PREFERRED EMBODIMENTS

The present invention is directed to an improved thermal ink-jet thin-film printhead device, particularly to the substructure thereof. The present invention also includes efficient and effective processes for fabrication of the thin-film device.

Figure 1:
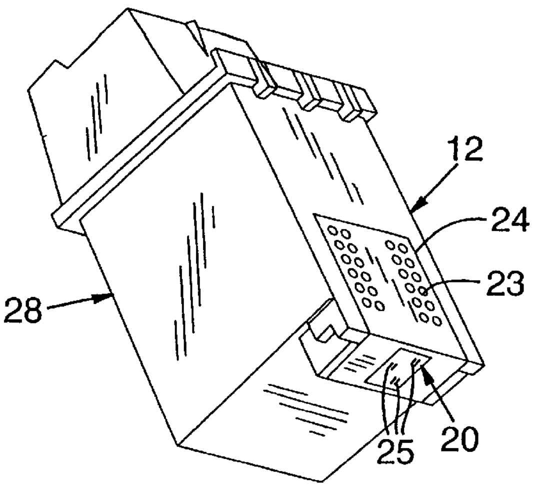
FIG. 1 is a perspective view of an ink-jet printer pen that includes a preferred embodiment of the thin-film printhead substructure.

An exemplary thermal ink-jet pen is illustrated in FIG. 1. The printhead device of the present invention may be part of the pen. In a preferred embodiment, the pen includes a pen body 12 defining a reservoir 28. The reservoir 28 is configured to hold a quantity of ink. A printhead 20 with an orifice plate 33 is fit into the bottom of the pen body 12 and controlled for ejection of ink droplets. The printhead includes minute nozzles 25 through which ink is expelled in a controlled pattern during printing.

Each nozzle 25 is in fluid communication with a firing chamber 44 (shown enlarged in FIG. 2) defined in the printhead 20 adjacent to the nozzle. Each firing chamber 44 is constructed adjacent to a part of the printhead substructure 16 that includes a transducer, preferably a resistor component 30 (FIG. 3). The resistor is selectively driven (heated) with sufficient electrical current to instantly vaporize some of the ink in chamber 44, thereby forcing an ink droplet through the nozzle 25.

Conductive drive lines for each resistor component 30 are carried upon a flexible circuit 24 mounted to the exterior of the pen body 12. Circuit contact pads 23 (shown enlarged in FIG. 1 for illustration) at the ends of the resistor drive lines engage similar pads carried on a matching circuit attached to the printer carriage (not shown). A signal for firing the resistors is generated by a microprocessor and associated drivers that apply the signals to the drive lines.

Figure 2:
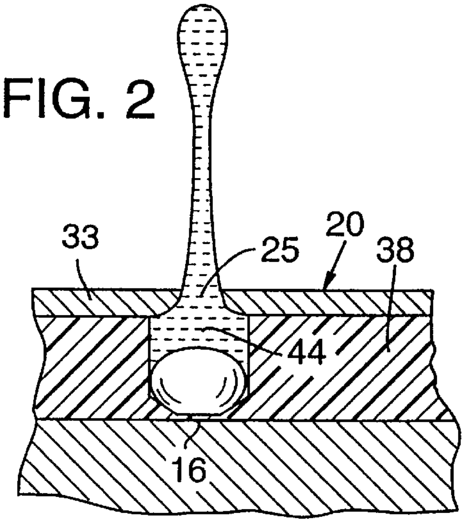
FIG. 2 is an enlarged, cross-sectional, partial view of a preferred embodiment of the thin-film printhead substructure of the present invention.
Figure 3:
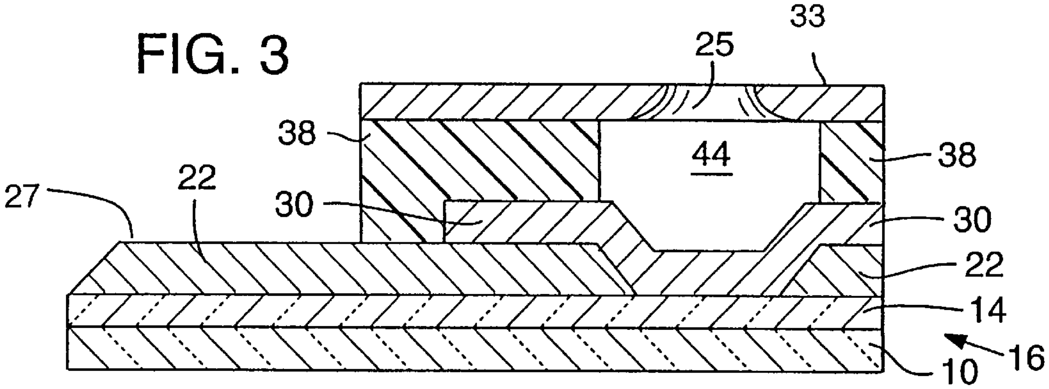
FIG. 3 is a greatly enlarged, cross-sectional, partial view of the thin-film printhead substructure made in accordance with a preferred embodiment of the present invention.

Referring to FIG. 2, the thin-film printhead substructure 16 of the present invention has affixed to it an ink barrier layer 38 and outer orifice plate 33. The ink barrier layer is shaped to define the ink chamber 44.

As illustrated in FIG. 3, the thin-film substructure 16 comprises a substrate 10, a thermally and electrically insulating layer 14, a conductor 22, and a resistor component 30. The resistor component 30, as described more thoroughly below, is a graded thin film structure that incorporates a resistive layer, a passivation layer and a cavitation barrier.

Referring to FIG. 3, a preferred embodiment of the printhead substructure is fabricated using two lithographic masks and a single sputter source material. The two-mask process is depicted in FIGS. 5*a–f*. The substrate 10 is typically a silicon wafer but may also comprise alumina, quartz or another material with characteristics similar to silicon.

Figure 5A:
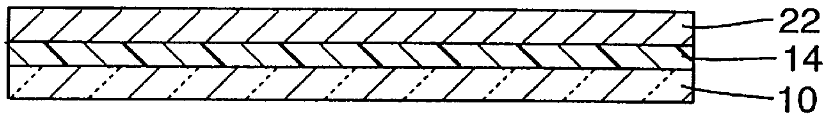
FIGS. 5*a–f* depict the sequence of steps for fabricating the thin-film printhead substructure of FIG. 3.

In a preferred embodiment, a relatively thick insulation layer 14 (also referred to as dielectric) is applied to substrate 10, preferably by conventional thermal oxidation techniques known in the art (FIG. 5*a*). A preferred insulation layer 14 comprises silicon dioxide with a thickness of about 1.7 $\mu$m. Sputtered silicon mono- or di- oxides may also be used for insulation layer 14. Additionally, insulation layer 14 may comprise borophosphate silicate glass or silicon nitride. Silicon nitride is preferably deposited by plasma enhanced chemical vapor deposition (PECVD), but could also be applied by chemical vapor deposition (CVD). The borophosphate silica glass may be applied by sputtering or high-temperature CVD.

Insulation layer 14 serves as both a thermal and electrical insulator to the circuit that will be built on its surface. It is notable that insulation layer 14 may be omitted altogether. Instead, a conductive layer may be deposited directly on certain substrate materials that possess dielectric and heat transfer characteristics suitable for directly receiving the desired conductive material.

A thin-film conductive layer 22 is next applied uniformly on top of insulation layer 14 (FIG. 5*a*). In a preferred embodiment, conductive layer 22 comprises a noble metal such as, for example, gold. The metal used to form conductive layer 22 may be doped or combined with other materials such as copper or silicon. Conductive layer 22 preferably has a uniform thickness of about 0.4 $\mu$m and is applied using conventional deposition techniques such as sputtering (i.e., physical vapor deposition) or PECVD.

Figure 5B:
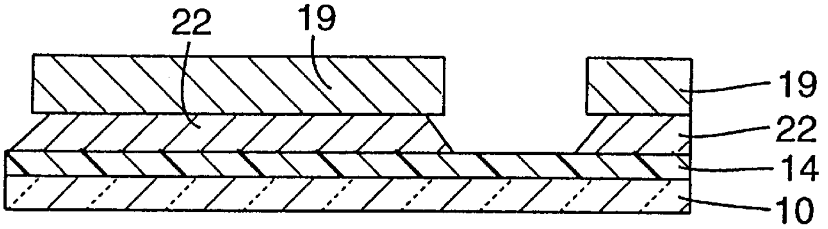

Referring to FIG. 5*b*, using a first lithographic mask, photoresist layer 19 is then applied on top of conductive layer 22 to define the length of the resistor component (measured side-to-side in FIG. 3) that is deposited next. The exposed portion of conductive layer 22 is isotropically etched using conventional wet or dry etch techniques. An isotropic wet etch using a mixture of nitric and hydrochloric acids is preferable. Photoresist layer 19 is then removed by techniques known to those skilled in the art.

Isotropic etching of the exposed portion of conductor layer 22 results in sloped conductive edge profiles. Sloped edge profiles provide for enhanced step coverage over conductor edges with application of the next thin-film layer. Step coverage concerns the ability of new thin-film layers to evenly cover "steps" formed in the existing wafer. Step coverage is crucial for thermal ink-jet reliability due to the substantial thermal, mechanical and chemical stresses to which these devices are subjected during a thermal ink-jet printing operation.

Figure 5C:
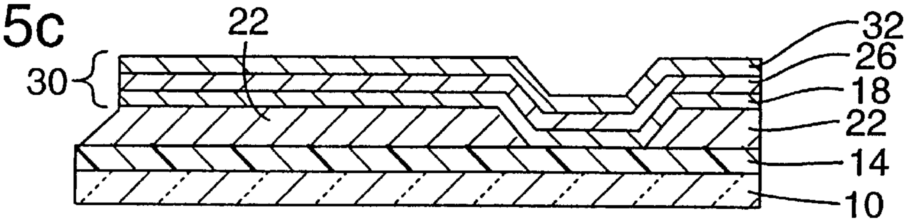

Referring generally to FIG. 5*c*, after conductive layer 22 is etched and photoresist 19 stripped, a graded, tri-layer resistor component 30 is applied to conductive layer 22 and the exposed portion of the insulation layer 14.

Resistor component 30 is also referred to as the "graded thin-film structure" (GTFS). The GTFS 30 comprises three different components, a resistor 18, a passivation layer 26 and a cavitation barrier 32, each of which performs a different function within the printhead substructure 16. The graded structure is depicted as three discrete layers, for illustration purposes, only in FIG. 5*c*. The three materials that comprise the resistor 18, passivation layer 26 and cavitation barrier 32, are graded in a manner, such that, only a single layer is produced.

That is, the lower portion of the GTFS 30, first comprises a relatively pure resistive material 18. Moving upward through the GTFS, the concentration of the resistor material decreases, as concentration of a passivation material gradually increases until the GTFS comprises a substantially pure passivation material. Continuing upward through the GTFS 30, the concentration of passivation material decreases as the concentration of a cavitation barrier material gradually increases. The uppermost portion of the GTFS 30, therefore, comprises a relatively pure cavitation barrier material. Thus, there are no discrete layers between the materials in the GTFS 30.

In a preferred embodiment, the GTFS 30 is deposited using conventional sputter techniques with a single sputter source material in a single vacuum pump-down. A standard physical vapor deposition (PVD) chamber with a target sputter source material is utilized to create the GTFS 30. Preferably, the target source material comprises substantially pure tantalum. The PVD chamber is plumbed to at least three gas sources, preferably argon, nitrogen and oxygen.

The insulated substrate 10, with the patterned conductive layer 22, is placed in the PVD chamber. The chamber is pumped down to create a vacuum environment within the chamber and the chamber is then back-filled with a mixture of preferred gases, argon and nitrogen. The first sputtered thin-film of GTFS 30 comprises the resistive material, preferably tantalum nitride. The resultant, relatively pure resistive material 18 is about 0.1 $\mu$m in thickness. As discussed above, refractory metals are preferred. Other materials that may be used for the resistor such as, for example, chrome, nichrome (NiCr), vanadium, tungsten or alloys of these materials.

In a preferred embodiment, the stream of nitrogen gas is gradually reduced while oxygen gas is simultaneously introduced. The change in concentration of the nitrogen and oxygen gases within the PVD chamber, in combination with the preferred tantalum sputter source, produces the graded structure. Specifically, a concentration of tantalum pentoxide is gradually increased as the concentration of tantalum nitride is gradually decreased, until the structure comprises a mixture of a small quantity of tantalum nitride relative to the tantalum pentoxide concentration. The sputtering progresses to the application of relatively pure tantalum pentoxide concentration that defines the passivation layer 26. The thickness of the relatively pure passivation material is preferably about 0.2 $\mu$m. The bulk of the passivation material 26 is sputtered with both the oxygen and argon gas streams continuing to enter the PVD chamber.

The main function of the passivation layer 26 is to protect the resistor 18 and other components from corrosive action of ink used within ink-jet pens.

When the passivation material 26 reaches a desirable thickness, the oxygen gas stream is gradually reduced so that, eventually, only argon gas enters the PVD chamber. The change in concentration of the gases in the chamber results in deposition of a graded structure between the passivation material 26 and a cavitation barrier material 32, in the same manner as discussed above in relation to the resistor 18 and passivation materials 26. In a preferred embodiment, the cavitation barrier 32 comprises substantially pure tantalum at approximately 0.2 $\mu$m in thickness.

The cavitation barrier film 32, that covers the passivation material 26 and resistor 18, eliminates or minimizes mechanical damage to the resistor 18, insulator 14 and passivation 26 thin-films due to the momentum of collapsing ink bubble. As mentioned above, in a preferred embodiment, the cavitation barrier comprises tantalum, although other materials such as, for example, tungsten or molybdenum may be used.

The use of tantalum pentoxide as the passivation material 26 allows a thinner insulation film than in conventional thin-film ink-jet pen printhead substructures. That is, since the resistive material 18 and the passivation material 26 are deposited in the same vacuum or pump-down process (i.e., the vacuum in the PVD chamber is not released between deposition of the two films) the resistor 18, therefore, possesses a cleaner surface upon which to apply the passivation material 26 relative to conventional processes. A cleaner surface on which to apply the next thin-film permits deposition of a thinner "layer." As a consequence of the thinner passivation "layer," the thin-film substructure possesses greater thermal efficiency because the thermal energy generated by the resistor is not reduced by the thick passivation layer or other interfacial layers interposed between the resistor component and ink within the firing chamber 44.

Additionally, the use of tantalum pentoxide as passivation material 26 provides a passivation layer having a higher critical dielectric breakdown field relative to conventional passivation materials such as, silicon nitride or silicon dioxide.

Figure 5D:
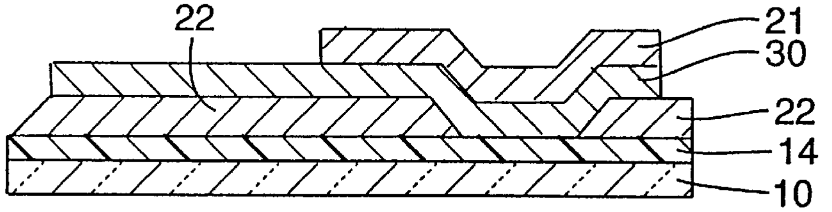

Referring to FIG. 5*d*, a second lithographic masking of a photoresist layer 21 is then applied to the GTFS 30 (here, for convenience, shown as a single layer). The exposed GTFS 30 is etched using fluorine containing plasma etchants such as $SF_6$. The photoresist 21 is removed by conventional techniques. The second mask defines the width of the resistor component of the GTFS that will underlie the ink chamber 44. The width of the resistor component is measured perpendicular to the plane of the substructure cross-section depicted in FIG. 5*d*.

As best illustrated by FIG. 5*c*, the resistive material 18 is in partial contact with conductive layer 22. The resistive material 18 is in direct contact with insulation layer 14 in those areas where the conductor layer 22 has been etched. Where portions of the conductive layer 22 are in contact with resistive material 18, the ability of the resistive material to generate significant amounts of heat, when an electrical current is applied, is defeated. Specifically, the electrical current, flowing via the path of least resistance, will be confined to conductive layer 22, thereby generating minimal thermal energy. Thus, the resistive material 18 will function as a heater only in those areas that resistive layer 18 is not in areal contact with conductive layer 22 (FIG. 5*d*). The portion of the resistive material 18 that is not in contact with conductive layer 22 is positioned under ink chamber 44 (FIG. 5*f*).

In addition to defining the width of the resistor, the second mask defines the conductive traces. The single conductor layer 22 serves as the conductive traces to deliver the signals to the appropriate resistor for firing an ink droplet. Thus, the conductive path for the electrical signal impulses that heat the resistor 18, is from one side of the conductive trace 22, (e.g., the side left of the GTFS 30 in FIG. 5*e*) through solely resistive material 18 to the other side of the conductive layer 22.

The same conductor layer 22 is patterned to define on one end a bonding pad 27 (shown in FIG. 3) to which a lead of the above-described circuit 24 is attached. The bonding pad of the conductive layer is located away from the resistor-contacting end of the conductor and is exposed at the junction of the circuit 24 and the printhead edge (FIG. 1).

Figure 5E:
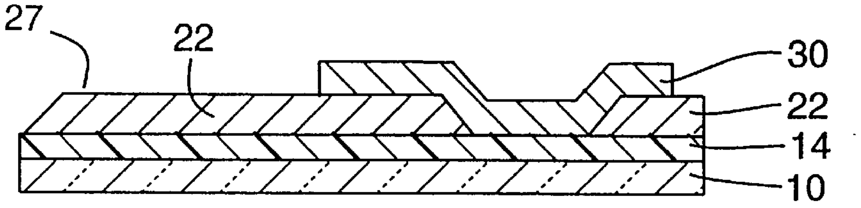
Figure 5F:
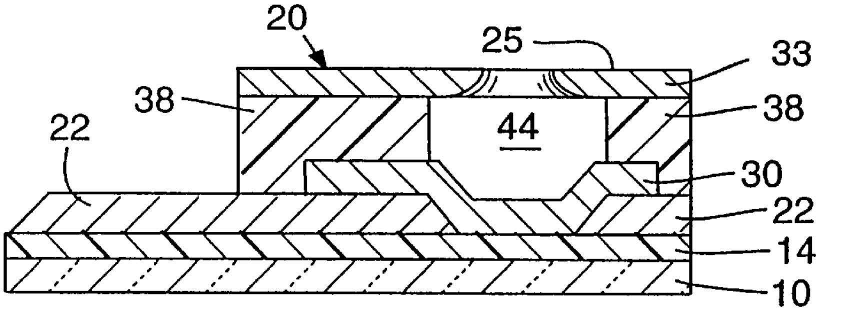

As illustrated in FIG. 5*e*, at this stage in fabrication, the printhead substructure 16 is complete, and the process moves to completion of the firing chamber 44.

The ink barrier 38 of the firing chamber 44 preferably consists of a photosensitive polymer (FIGS. 2 and 5*f*). This polymer is etched to define the walls of the firing chamber 44. In this regard, the firing chamber 44 is substantially cubical in shape, preferably, with a height of about 25 μm, a width of about 40 μm and a length of about 40 μm. Other firing chamber shapes are acceptable.

Orifice plate 33 (preferably manufactured of nickel) is bonded to the top of the ink barrier 38 as shown in FIG. 5*f*. The orifice plate 33 includes a plurality of nozzles 25, each nozzle corresponding to one of the resistors.

Figure 6A:
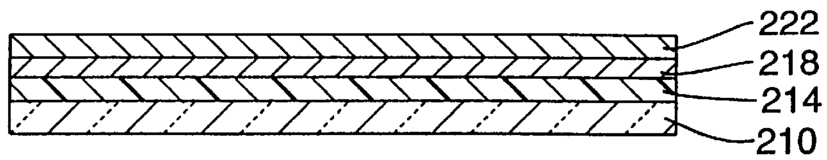
FIGS. 6*a–f* depict the sequence of steps for fabricating another embodiment of the thin-film printhead substructure.
Figure 6B:
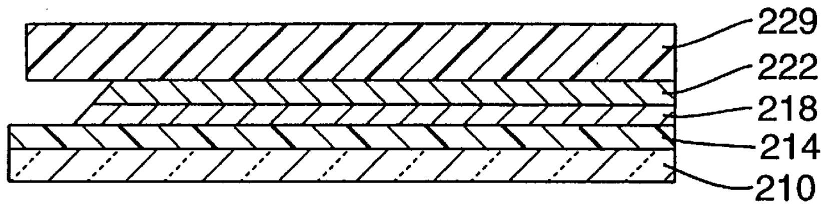
Figure 6C:
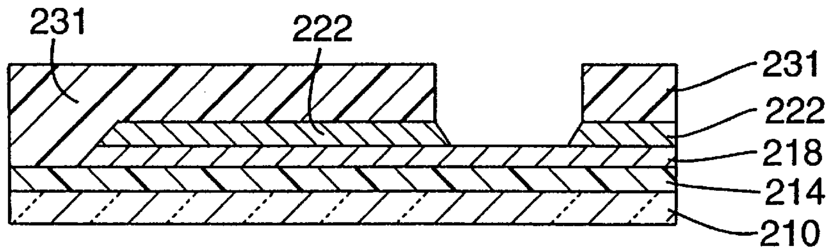
Figure 6D:
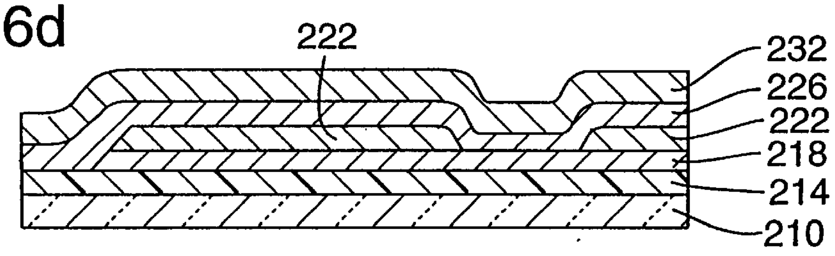
Figure 6E:
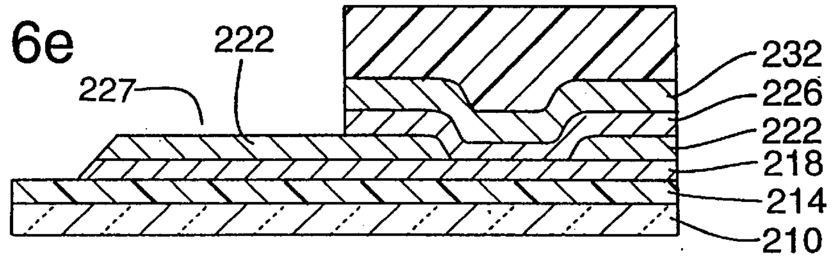
Figure 6F:
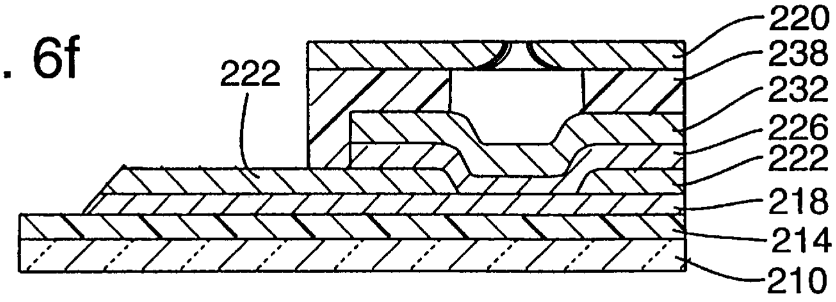

Another preferred embodiment of the thin-film printhead substructure is depicted in FIG. 6*f*, with the fabrication process illustrated in FIGS. 6*a*–*f*. This preferred embodiment involves a three lithographic mask fabrication process.

Substrate 210 materials are identical to those materials for the embodiment discussed above (i.e., preferably a silicon wafer). A relatively thick (about 1.7 μm) insulation layer 214 is applied on substrate 210 (FIG. 6*a*) as discussed above with respect to FIG. 5*a*.

A resistive layer 218 is then applied to uniformly cover the surface of insulation layer 214 (FIG. 6*a*). Next, a conductive layer 222 is applied over the surface of resistive layer 218. The resistor 218 and conductor 222 materials preferably comprise tantalum nitride and gold, respectively, for reasons discussed above.

The resistivity, sheet resistance and thermal coefficient of resistance for resistor 218 may be selected to emulate conventional tantalum/aluminum thin-film devices, such that a printhead device of the present invention may be retrofitted in conventional thermal ink-jet pens. Thus, in a preferred embodiment, tantalum nitride thin-film layer (i.e., refractory metal-based resistor layer 218) is preferably about 0.1 μm in thickness and gold thin-film layer (i.e., noble-metal based conductive layer 222) is about 0.4 μm in thickness. Resistive layer 218 is preferably applied by reactive sputter deposition techniques, while conductive layer 222 is preferably applied by sputter deposition.

Photoresist layer 229 (FIG. 6*b*) is then applied. The masking of conductor layer 222 with photoresist layer 229 defines the width of resistor 218. The width of the resistor component is measured perpendicular to the plane of the substructure cross-section depicted in FIG. 6*c*. The exposed portions of conductive layer 222 and resistive layer 218 are then etched.

Etching processes preferred for etching a tantalum-based resistive material include dry freon-based plasma or selective wet etching processes. A diluted mixture of nitric and hydrochloric acids is preferred for etching a conductive layer comprising gold. Resistive and conductive layers 218, 222 are etched isotropically, thereby providing the layers with beveled or sloped edges (FIG. 6*b*). Beveled edges provide the advantages discussed above in relation to the conductive layer 22, as depicted in FIG. 5*b*.

Additionally, the first mask simultaneously defines in the conductive traces. The single conductive layer 222 serves as the conductive traces to deliver the signals to the appropriate resistor for firing an ink droplet. Thus, the conductive trace or path for the electrical signal impulses that heat the resistor 218 is from one side of the conductive layer 222 (e.g., the side left of the exposed resistor component) through solely resistive material to the other side of the conductive layer 222.

The same conductive layer 222 is patterned to define on one end a conductive bonding pad 227 (FIG. 6*e*) to which a lead of the above-described circuit 24 is attached. The bonding pad of the conductive layer is located away from the resistor-contacting end of the conductor and is exposed at the junction of the circuit 24 and the printhead edge (FIG. 1).

A second lithographic masking defines the length of the resistor (measured side-to-side in FIG. 6*f*) through application of patterned photoresist layer 231 (FIG. 6*c*). The exposed portion of conductive layer 222 is etched, exposing a portion of resistive layer 218 which operates as the heater element for the printhead substructure 216 in the same manner as discussed in relation to the above-described embodiment.

A passivation layer 226 is then applied uniformly over the device at a thickness of about 0.75 μm (FIG. 6*d*). In a preferred embodiment, two passivation layers 226, rather than a single passivation layer, are applied. Preferably, the two passivation layers (referred to as one layer 226, for convenience) comprise a layer of silicon carbide and a layer of silicon nitride. The deposition sequence of the silicon carbide and silicon nitride layers is reversed relative to the typical deposition sequence for conventional thin-film printhead devices. The silicon carbide layer is deposited on conductive layer 222 and then the silicon nitride layer is deposited. Depositing the silicon carbide passivation layer directly on conductive layer 222 improves the relatively poor adhesion of silicon nitride passivation material to gold conductive layer 222 found in conventional printhead devices.

Immediately after the passivation layer 226 is deposited, cavitation barrier 232 is applied (FIG. 6*d*). In a preferred embodiment, the cavitation barrier comprises tantalum. Tantalum may be deposited by a reactive sputter process or other techniques known in the art.

Insulation layer 214, resistor layer 218, conductive layer 222, passivation layer 226 and cavitation barrier 232 serve the relevant functions discussed above in relation to the preferred embodiment depicted in FIGS. 5*a*–5*f*.

A third lithographic mask is then applied for the etching of undesirable portions of cavitation barrier 232 and passivation layer 226 (FIG. 6*e*). Wet/dry or dry etch only processes may be used to remove the exposed portions of the cavitation barrier and passivation layer. In a preferred embodiment, the dry etch process comprises a fluorinated plasma etchant chemistry (for example, $SF_6$).

To complete the firing chamber, an ink barrier 238 and orifice plate 220 are then applied to the structure as discussed above in relation to the preferred embodiment depicted in FIG. 5*f*.

Figure 4:
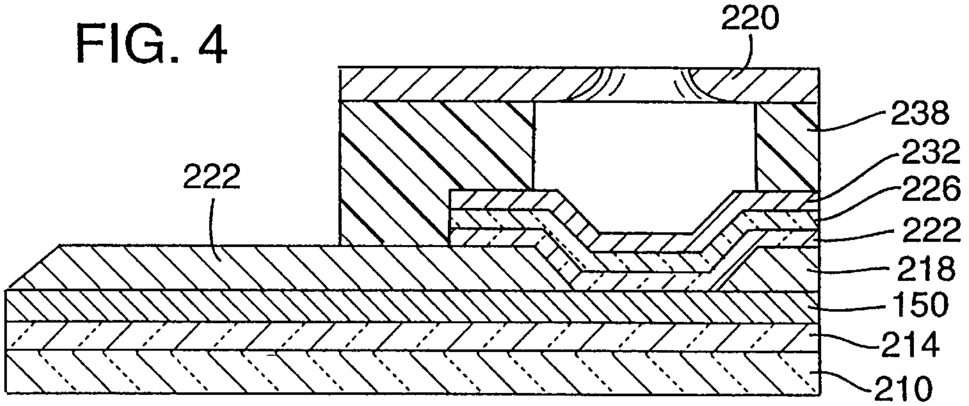
FIG. 4 is a greatly enlarged, cross-sectional, partial view of the thin-film printhead substructure made in accordance with another embodiment of the present invention.

In an alternative embodiment of the present invention, the fabrication process depicted in FIGS. 6*a*–6*f* would be duplicated with the addition of a metal barrier layer 150. The metal barrier layer 150 is deposited on a resistive layer 218 (FIG. 4), before a conductive layer 122 is applied. The metal barrier layer 150 preferably comprises titanium nitride or tantalum nitrides. Metal barrier layer 150 is preferably sputter deposited from a conventional powder or bar target. The metal barrier layer 150 inhibits electromigration of tantalum atoms of the resistive material 218 through gold conductive layer 222, preventing contamination of the conductor surface with undesirable tantalum oxide residues.

In yet another embodiment of the present invention, the resistive layer 118 could be omitted altogether. A barrier metal layer 150, similar to the metal barrier layer discussed above, could serve as a resistor, further simplifying the printhead structure and fabrication process. The process flow would be identical to that described immediately above, but application and etching of a resistive layer would not be necessary.

Having described and illustrated the principles of the invention with reference to the preferred embodiments, it should be apparent that the invention can be further modified in arrangement and detail without departing from such principles. For example, a metal barrier layer could be applied beneath a GTFS, or deposited between an insulation layer and a conductive layer thereby serving as a bonding or gluing layer.

The invention claimed is:

1. A method of fabricating a thermal ink-jet printhead substructure comprising the steps of:

providing a substrate;

forming at least one layer of each of a conductive material and a resistive material on the substrate;

covering at least part of the resistive material with passivation material; and masking and removing predetermined areas of the conductive and resistive material to define a resistor member, conductive traces and conductive bonding pads utilizing no more than two lithographic masks.

2. The method of claim 1 wherein the forming step comprises depositing on the substrate the conductive material and thereafter depositing the resistive material.

3. The method of claim 1 wherein the covering step includes covering at least part of the resistive material with a passivation layer having a thickness of about 0.2 $\mu$m.

4. The method of claim 1 wherein the forming step comprises depositing on the substrate the resistive material and thereafter depositing the conductive material and wherein the covering step includes depositing the passivation material in two layers, a first passivation layer being deposited before a second passivation layer and the first passivation layer comprising silicon carbide.

5. The method of claim 1 including the step of depositing a metal barrier layer between the conductive material and resistive material.

6. A method of fabricating a thermal ink-jet printhead substructure comprising the steps of:

providing a substrate forming at least one layer of each of a conductive material and a resistive material on the substrate;

covering at least part of the resistive material with passivation material; and masking and removing predetermined areas of the conductive and resistive material to define a resistor member, conductive traces and conductive bonding pads utilizing two lithographic masks; and wherein the forming step comprises depositing on the substrate the conductive material and thereafter depositing the resistive material.

7. The method of claim 6 wherein the covering step includes covering at least part of the resistive material with a passivation layer having a thickness of about 0.2 $\mu$m.

8. The method of claim 6 wherein the forming step comprises depositing on the substrate the resistive material and thereafter depositing the conductive material and wherein the covering step includes depositing the passivation material in two layers, a first passivation layer being deposited before a second passivation layer and the first passivation layer comprising silicon carbide.

9. The method of claim 6 including the step of depositing a metal barrier layer between the conductive material and resistive material.

10. The method of claim 6 wherein the forming step includes depositing titanium nitride as the resistive material.

11. The method of claim 6 wherein the forming step includes depositing a tantalum nitride as the resistive material.

12. The method of claim 1 including the step of covering at least part of the passivation material with a cavitation layer.

* * * * *